(12) United States Patent
George et al.

(10) Patent No.: US 11,987,382 B2
(45) Date of Patent: May 21, 2024

(54) METHOD FOR AIRCRAFT LOCALIZATION AND CONTROL

(71) Applicant: Merlin Labs, Inc., Boston, MA (US)

(72) Inventors: Matthew George, Boston, MA (US); Alexander Naiman, Boston, MA (US); Joseph Bondaryk, Boston, MA (US)

(73) Assignee: Merlin Labs, Inc., Boston, MA (US)

( * ) Notice: Subject to any disclaimer, the term of this patent is extended or adjusted under 35 U.S.C. 154(b) by 16 days.

(21) Appl. No.: 17/674,518

(22) Filed: Feb. 17, 2022

(65) Prior Publication Data

US 2022/0258880 A1    Aug. 18, 2022

Related U.S. Application Data

(60) Provisional application No. 63/150,267, filed on Feb. 17, 2021.

(51) Int. Cl.
| | |
|---|---|
| *B64D 45/08* | (2006.01) |
| *G01S 13/933* | (2020.01) |
| *G01S 17/933* | (2020.01) |
| *G05D 1/00* | (2024.01) |

(52) U.S. Cl.
CPC ............ *B64D 45/08* (2013.01); *G01S 13/933* (2020.01); *G01S 17/933* (2013.01); *G05D 1/101* (2013.01)

(58) Field of Classification Search
CPC ..... B64D 45/08; G01S 13/933; G01S 17/933; G05D 1/101
See application file for complete search history.

(56) References Cited

U.S. PATENT DOCUMENTS

| | | | |
|---|---|---|---|
| 9,222,799 B1* | 12/2015 | Bell ................... | G01C 21/1652 |
| 10,847,042 B2 | 11/2020 | Rose et al. | |
| 2019/0197908 A1* | 6/2019 | Mozer .................... | B64D 45/08 |
| 2020/0050217 A1* | 2/2020 | Rose ....................... | G05D 1/101 |
| 2020/0312170 A1* | 10/2020 | Sherback ............. | G08G 5/0021 |
| 2021/0216071 A1* | 7/2021 | Kendoul ................. | G06T 7/75 |
| 2021/0405654 A1* | 12/2021 | Ulun ....................... | G05D 1/101 |
| 2022/0067542 A1* | 3/2022 | Plawecki ................ | G06N 5/04 |

OTHER PUBLICATIONS

Federal Aviation Regulation § 91.175.*

* cited by examiner

*Primary Examiner* — Jess Whittington
*Assistant Examiner* — Brian E Yang
(74) *Attorney, Agent, or Firm* — Jeffrey Schox; Diana Lin (57) ABSTRACT

The method can include: sampling sensor measurements, extracting features from the sensor measurements, identifying a landing site based on the extracted features, determining a confidence score based on the extracted features and landing site features, and controlling the aircraft. The method functions to provide terrain relative navigation during approach to be used for aircraft control; the method can additionally function to establish an aircraft position estimate to be used for controlling the aircraft.

12 Claims, 7 Drawing Sheets

FIGURE 7

METHOD FOR AIRCRAFT LOCALIZATION AND CONTROL

CROSS REFERENCE TO RELATED APPLICATIONS

This application claims the benefit of U.S. Provisional Application No. 63/150,267, filed Feb. 17, 2021, which is incorporated herein in its entirety by this reference.

TECHNICAL FIELD

This invention relates generally to the aviation field, and more specifically to a new and useful localization and control method in the aviation field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. OVERVIEW

Figure 1:
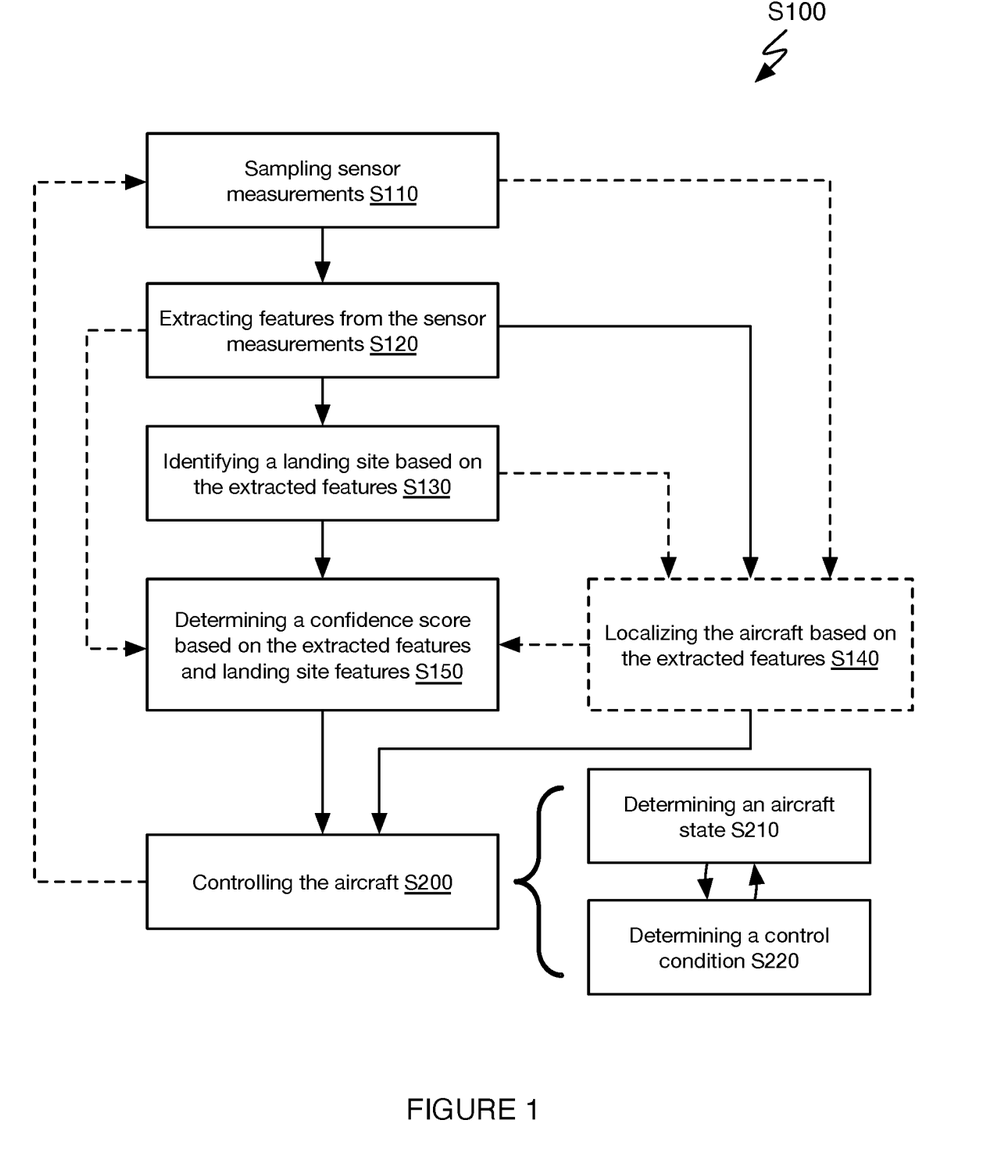
FIG. 1 is a diagrammatic representation of a variant of the method.

The method S100, an example of which is shown in FIG. 1, can include: sampling sensor measurements S110, extracting features from the sensor measurements S120, identifying a landing site based on the extracted features S130, determining a confidence score based on the extracted features and landing site features S150, and controlling the aircraft S200. The method S100 can optionally include localizing the aircraft based on the extracted features S140. However, the method S100 can additionally or alternatively include any other suitable elements. S100 functions to provide terrain (e.g., land, ground infrastructure, etc.) relative navigation during approach to be used for aircraft control. S100 can additionally function to establish an aircraft position estimate to be used for controlling the aircraft (e.g., during a landing sequence).

Controlling the aircraft S200 can include: determining an aircraft state S210 and determining a control condition S220. In variants, different features, aircraft states, and/or control conditions can be used for different flight regimes or segments (e.g., above MDA/MDH, final approach, short final, etc.). However, the S200 can additionally or alternatively include any other suitable elements. S200 functions to enable traversal of an aircraft to a predetermined landing site and/or according to a mission plan.

The method S100 (and/or S200) is preferably implemented in conjunction with and/or executed by an aircraft, such as a rotorcraft (e.g., helicopter, multi-copter), fixed-wing aircraft (e.g., airplane), STOL aircraft, lighter-than-air aircraft, multi-copter, and/or any other suitable aircraft. The method can be implemented with an autonomous aircraft, unmanned aircraft (UAV), manned aircraft (e.g., with a pilot, with an unskilled operator executing primary aircraft control), semi-autonomous aircraft, and/or any other suitable aircraft. The aircraft is preferably an autonomous aircraft configured to execute flight commands according to a mission plan using a flight processor without user (e.g., pilot) intervention. Additionally or alternatively, the method can be implemented on a semi-autonomous vehicle and/or human-operated vehicle as a flight aid.

The term "substantially" as utilized herein can mean: exactly, approximately, within a predetermined threshold or tolerance, and/or have any other suitable meaning.

1.1 Variants.

In a first set of variants, a method for controlling an aircraft according to a mission plan defining a landing site can include: automatically determining satisfaction of a proximity threshold and, in response: identifying a set of visual references based on features extracted from measurements collected using a first set of aircraft sensors onboard the aircraft and determining a confidence score associated with the identification of the set of visual references (e.g., a localization confidence score); and when the confidence score satisfies a confidence threshold, automatically controlling the aircraft to fly within an approach corridor of the landing site based on the set of visual references (e.g., the same as those used to determine the confidence score or a different set, determined from subsequent measurements, etc.). Controlling aircraft flight within the approach corridor can include: estimating an aircraft state based on a position of at least one of the visual references of the set (e.g., known visual reference position, position of the visual reference relative to the aircraft, etc.); and generating navigational instructions based on the aircraft state. In variants, the first set of aircraft sensors includes LIDAR and/or RADAR. In variants, the method further includes, prior to automatically determining satisfaction of the proximity threshold: estimating an instrument-derived aircraft state based on a second set of aircraft sensors, wherein the first and second sets of aircraft sensors are disjoint; and based on the instrument-derived aircraft state, generating instrument-derived navigational instructions according to the mission plan. In examples, the method can further include extracting a first and a second set of features from measurements from a first and second aircraft sensor of the first sets of aircraft sensors, respectively; identifying a first subset of visual references using only the first set of features; identifying a second subset of visual references using only the second set of features; and determining the confidence score based on the identification of both the first and second subsets of visual references. In variants, the set of visual references are stored at a local memory onboard the aircraft in association with the landing site. In variants, the set of visual references can include a series of alphanumeric characters, a threshold marking, a touchdown zone marking, designation marking, and/or a side stripe. In variants, the set of visual references can include a map of luminaires. In variant, the aircraft state includes an aircraft alignment relative to a longitudinal runway feature, wherein the navigational instructions comprise a lateral adjustment based on the aircraft alignment. In variants, the method can further include, subsequently: extracting a second set of features using measurements from the second set of sensors; identifying a second set of visual references based on the second set of features; estimating an updated aircraft state based on the second set of visual references; based on the updated aircraft state, determining a go-around event; and automatically generating navigational instructions for a go-around maneuver based on the determination of the go-around event. In variants, the aircraft state is estimated with simultaneous localization and mapping (SLAM) based on the extracted features. In variants, automatically controlling the aircraft further includes: automatically providing the navigational instructions to a flight control system of the aircraft in response to receiving a pilot validation of the navigational instructions.

In a second set of variants, a method for autonomous aircraft control includes: sampling measurements of a landing region using a LIDAR sensor onboard the aircraft; sampling measurements of the landing region using a radar sensor onboard the aircraft; determining a position estimate and an accuracy metric of the aircraft based on: visual features, extracted from the measurements (e.g., from the LIDAR measurements, from camera measurements, etc.), that match a set of visual features associated with the landing site; and geometric features, extracted from the measurements (e.g., LIDAR and/or radar measurements), that match a set of geometric features associated with the landing site; and when the accuracy metric satisfies a threshold (e.g., is above a threshold), navigating to a landing site within the landing region based on the position estimate. In variants, the set of geometric features and the set of visual features associated with the landing site are stored onboard the aircraft. In variants, the geometric features are extracted from the first set of measurements fused with the second set of measurements. In variants, the method is performed when the aircraft is within a predetermined proximity threshold of the landing region, wherein the aircraft is autonomously controlled using a different set of sensors outside of the proximity threshold. In variants, the method further includes: automatically executing a go-around maneuver when the accuracy metric fails the threshold. In variants, the accuracy metric is calculated based on at least one of: a confidence level for the position estimate, an accuracy measure for the set of extracted geometric features, an accuracy measure for the set of extracted visual features, an accuracy measure for the first set of measurements, an accuracy measure for the second set of measurements, and/or any other accuracy metric. In variants, measurements are iteratively sampled by the LIDAR sensor and the radar sensor during navigation to the landing site, wherein the measurements (e.g., sampled by the LIDAR, radar, and/or other sensor) can be used to validate that the aircraft is aligned with a runway during short final.

In a third set of variants, a method for an aircraft can include: collecting a set of measurements from a time-of-flight sensor onboard an aircraft directed toward a landing site; extracting a set of features based on the set of measurements; estimating an aircraft state based on a comparison of the set of features and a predetermined feature dataset for a landing site (e.g., stored in local memory onboard the aircraft), the aircraft state including a lateral alignment parameter relative to the landing site; and automatically controlling the aircraft based on the lateral alignment parameter. In variants, automatically controlling the aircraft includes: automatically determining satisfaction of an abort condition based on the lateral alignment parameter; and in response to determining satisfaction of the abort condition, automatically controlling the aircraft to execute a go-around maneuver. In an example, automatically determining satisfaction of the abort condition includes: generating an aircraft trajectory based on the lateral alignment; and determining that the aircraft trajectory deviates from at least one of: a flight envelope of the aircraft and/or an approach corridor of the landing site.

2. BENEFITS

Variations of the technology can afford several benefits and/or advantages.

First, variations of this technology can enable automated or autonomous aircraft landing sequences without the use of GPS or additional ground infrastructure. Such variants can utilize various optical and/or time-of-flight sensors (e.g., radar, LIDAR, etc.) to detect a landing site (e.g., runway) to satisfy requirements to establish visual reference or an analog thereof. Accordingly, variants can utilize terrain relative navigation (TRN) techniques to supplement and/or replace GPS and/or inertial localization during various portions of aircraft flight. In a specific example, TRN techniques can provide auxiliary navigation which can be used to validate a GPS position estimate above the minimum descent altitude (MDA) for a particular landing site, and can be used as the primary navigational modality below the MDA during the aircraft's approach and/or landing sequence. In another example, the system and method can function as a replacement (or aid) for a pilot flying based on visual flight references, and can detect the visual features specified by the landing site's final approach flightpath. However, variants can otherwise suitably enable automated/autonomous aircraft landing.

Second, variations of this technology can automatically validate that the aircraft has arrived at the correct landing site (e.g., runway), based on features extracted from the sensor measurements and a set of reference features unique to the landing site. This verification can further enable the technology to automatically retrieve the correct feature map for localization relative to the landing site.

Third, variations of this technology can improve lateral and/or vertical alignment of an aircraft trajectory during a landing sequence by automatically detecting landing site features and adjusting the flightpath to compensate for any misalignment thereto. Accordingly, such variants can provide improved accuracy and reliability when compared to human piloted flight. In variants, aircraft optical and/or time of flight sensors (e.g., LIDAR, radar, etc.) can provide an improved field-of-view and/or resolution when compared to human perception from within the aircraft cockpit. In a specific example, pilots may be required to land an aircraft with a partially or fully obstructed view of the landing site, such as during an aerodynamic flare (when the nose is pitched upwards), whereas sensors mounted to the nose, underside, and/or belly of the aircraft may operate with an unobstructed view of the ground (landing site and/or surrounding area) during all portions of the landing sequence. Additionally, variants can localize the aircraft based on predetermined landing site features which might otherwise be unobservable to a human—such as a unique 'shape of ground' proximal to the landing site, adjacent structures, and/or other features which can improve identification of (and/or localization relative to) a landing site.

However, variants of the technology can additionally or alternately provide any other suitable benefits and/or advantages.

3. SYSTEM

The system 100 can include: a set of onboard sensors 110, an onboard computing system 120, and/or any other suitable components. The system 100 functions to facilitate execution of the method S100 and/or control of an aircraft in accordance with S200.

The set of onboard sensors 110 functions to collect measurements in accordance with Block S110 of the method. Additionally or alternatively, the set of onboard sensors can be used to generate an aircraft state estimate to facilitate aircraft navigation and control in accordance with the method. The set of onboard sensors can include one or more: time-of-flight sensors (e.g., radar, LIDAR, time-of-flight camera, etc.), radar sensors (e.g., radar altimeter, etc.), LIDAR sensors, sonar sensors, cameras (e.g., CCD, CMOS, multispectral, visual range, hyperspectral, infrared, stereoscopic, etc.), wave-based sensors (e.g., light waves, sound waves, etc.), light-based sensors (e.g., cameras, visual spectrum, IR spectrum, radio-frequency spectrum, etc.), spatial sensors (e.g., inertial measurement sensors, IMU, INS, accelerometer, gyroscope, altimeter, magnetometer, AHRS, compass, etc.), location sensors (e.g., GPS, GNSS, triangulation, trilateration, etc.), air data sensors (e.g., airspeed, pressure, temperature, etc.), force sensors, vibration sensors, and/or any other suitable set of sensors. Sensors can be mounted within an interior of the aircraft, mounted at a fluidic exterior, mounted fore, aft, to the sides, to an aircraft component (e.g., wings, tail, fuselage, etc.), and/or arranged at any other suitable locations onboard the aircraft. Terrain detection sensors (e.g., time-of-flight, ranging sensors, camera, LIDAR, radar, etc.) are preferably mounted on an inferior surface of the aircraft (e.g., the nose and/or underside/underbelly of the aircraft) and oriented with a field of view directed toward the ground (e.g., and/or spanning a region of terrain proximal to the aircraft), but can additionally or alternatively be mounted on a superior surface of the aircraft, inside the cockpit (e.g., proximal to a pilot seat, with a field of view substantially equivalent to a pilot and/or windshield, directed out of the front windshield, etc.), and/or can be otherwise suitably distributed about the aircraft. The sensors are preferably electrically and/or communicatively coupled to the computing system, and can be configured to collect measurements with any suitable timing and/or measurement frequency in accordance with the method S100.

However, the system 100 can include any other suitable set of sensors; and, additionally, the onboard computing system can be configured to receive sensor measurements from any other suitable aircraft sensors and/or remote sensing infrastructure. Additionally or alternatively, the system can be entirely or partially controlled by one or more remote computing systems, distributed computing system, and/or any other computing system.

The onboard computing system 120 functions to facilitate onboard processing and execution of S200 and/or any other suitable portions of the method. The onboard computing system can include any suitable data processors and/or processing modules. Data processing for the various system and/or method elements preferably occurs locally onboard the aircraft at the onboard computing system, but can additionally or alternatively be distributed among remote processing systems (e.g., for primary and/or redundant processing operations), such as at a remote validation site, on a cloud computing system, and/or at any other suitable location(s).

Figure 7:
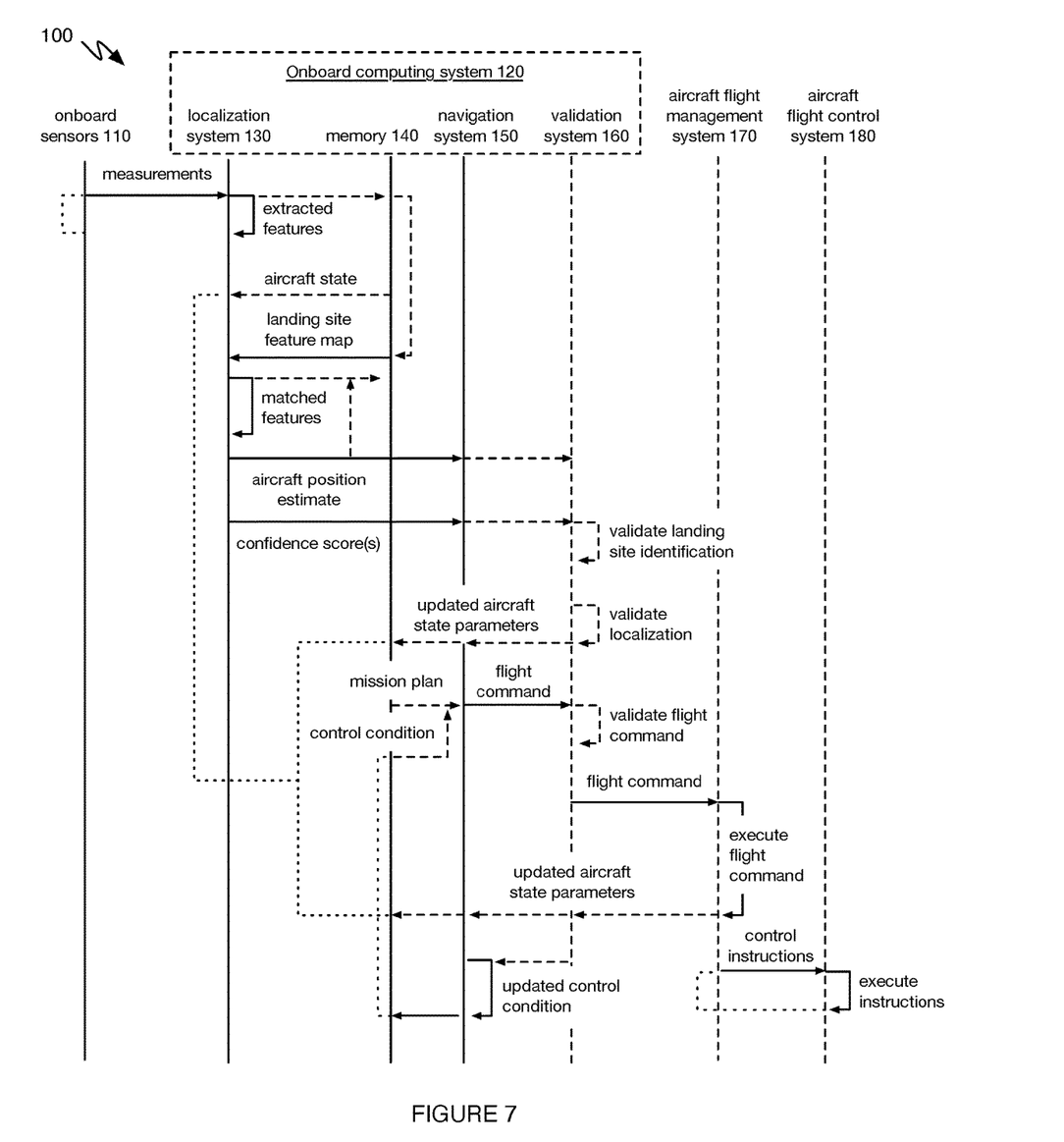
FIG. 7 is a diagrammatic representation of a variant of an aircraft system executing a variant of the method.

In variants, such as in the variant illustrated in FIG. 7, the onboard computing system can include: a localization system 130, a memory 140 (e.g., storing maps for one or more landing sites, models, execution instructions, etc.), a navigation system 150, a validation system 160, and/or any other suitable components. The onboard computing system can optionally include or be used in conjunction with an aircraft flight management system (FMS) 170 and/or an aircraft flight control system (FCS) 180. Elements of the onboard computing system can be centralized (e.g., at a single processor and/or compute node) or distributed between various processors and/or processing modules. For example, the localization system 130 and the navigation system 140 may be integrated into a single processing module, or may be processed separately. Likewise, the validation system may be distributed between various processing elements (e.g., localization system 130 and/or navigation system iso), or processed separately. However, the onboard computing system can include any other suitable components, and/or the method S100 can be performed with any other suitable computer architecture.

The memory can store a map (of known features), which functions to store known positions of features to facilitate terrain-relative navigation and/or landing site identification. The map can be unified/global (e.g., unified map of all landing sites in a network), landing site specific (e.g., a map of the terrain surrounding a particular approach corridor for a runway or airstrip), mission specific (e.g., received and stored prior to initiation of a mission, received and stored during a mission, generated and/or updated during a mission—such as a SLAM map, etc.), feature specific (e.g., store a specific set of features associated with a sensor, visual reference, etc.), and/or otherwise stored/indexed in the memory. As an example: a map can be generated by storing a subset of features extracted from measurements of a set of flyovers, such as features which are repeatedly observed across missions over a long time horizon (e.g., of months, years, etc.).

The map preferably includes features along with a position reference (e.g., coordinates in an earth reference frame) and feature parameters (e.g., which describe characteristics of the feature; RGB values, shape, classifications, size, alphanumeric characters, etc.). The map can include values for parameter associated with: visual features (e.g., color values, etc.), geometric features (e.g., size, shape of ground, etc.), visual references (and/or features associated therewith), and/or any other suitable parameters or parameter values. For example, a map can include features associated with a set of (predetermined) visual references for a landing site, which can include: a longitudinal runway features, luminaire arrays, designation markings, alphanumeric characters, threshold markings, touchdown zone markings, side stripes, and/or any other suitable visual references. Additionally or alternatively, maps can include earth-referenced features which may be non-descriptive of visual references (e.g., descriptive of terrain shape or topography elements, appearance or shape of terrestrial infrastructure, etc.).

In a specific example, mapped features can describe a geometry and/or visual appearance of a barn near an airstrip (e.g., with an associated earth-referenced position). In a second example, the mapped features can describe the topography of specific terrain features, such as a hill, light post, or ATC tower.

However, the memory can include any other suitable map(s) and/or otherwise suitably localize the aircraft relative to terrain features.

However, the system 100 can include any other suitable elements and/or can otherwise facilitate execution of the method S100.

4. METHOD

The method S100, an example of which is shown in FIG. 1, can include: sampling sensor measurements S110, extracting features from the sensor measurements S120, identifying a landing site based on the extracted features S130, determining a confidence score based on the extracted features and landing site features S150, and controlling the aircraft S200. The method S100 can optionally include localizing the aircraft based on the extracted features S140. However, the method S100 can additionally or alternatively include any other suitable elements. S100 functions to provide terrain relative navigation during approach to be used for aircraft control. S100 can additionally function to establish an aircraft position estimate to be used for controlling the aircraft (e.g., during a landing sequence).

Controlling the aircraft S200 can include: determining an aircraft state S210 and determining a control condition S220. However, the S200 can additionally or alternatively include any other suitable elements. S200 functions to enable traversal of an aircraft to a predetermined landing site and/or according to a mission plan. The mission plan can include a set of navigation parameters—such as waypoints—which navigation/guidance systems can utilize to control the aircraft from a departure site to a landing site. The landing site is preferably predetermined and/or prescribed within the mission plan, however the mission plan can additionally or alternatively include a set of auxiliary landing sites (e.g., in the event that the aircraft cannot land at the predetermined landing site). The method S100 can be executed repeatedly, periodically, and/or continuously during any suitable portions of flight, but can alternatively be used to provide a single determination (e.g., detecting the landing site while functioning as a flight aid, etc.). Additionally or alternatively, the method can include execution of different variants of method elements during different portions of flight, based on the aircraft state and/or control condition.

Sampling sensor measurements S110 functions to detect the terrain and/or a shape of ground and/or other permanent/stationary objects (buildings, etc.). S110 can additionally or alternatively function to enable aircraft localization and/or mission planning. Additionally or alternatively, S110 can function to collect measurements which may be used to identify/detect visual references (e.g., during a landing sequence). Sensor measurements are preferably sampled by the set of onboard sensors 110, but can be collected by any suitable set of sensors. Measurements can include: time-of-flight sensor measurements (e.g., sampled by radar, LIDAR, time-of-flight camera, etc.), radar measurements, LIDAR measurements, sonar measurements, camera images (e.g., sampled by CCD, CMOS, multispectral, visual range, hyperspectral, infrared, stereoscopic, etc.), wave-based measurements (e.g., light waves, sound waves, etc.), light-based measurements (e.g., cameras, visual spectrum, IR spectrum, radio-frequency spectrum, etc.), spatial measurements (e.g., sampled by inertial measurement sensors, IMU, INS, accelerometer, gyroscope, altimeter, magnetometer, AHRS, compass, etc.), location data (e.g., GPS measurements, GNSS measurements, triangulation, trilateration, etc.), air data (e.g., airspeed, pressure, temperature, etc.), force sensors, vibration sensors, and/or any other suitable set of sensors. Sensor measurements can be timestamped and/or sampled at any suitable interval(s). Accordingly, measurements sampled across various sensors can be synchronous, asynchronous, continuous, discrete and/or sampled with any suitable timing.

In variants, measurements can be collected with a combination of higher-frequency wave-based sensors (e.g., LIDAR or a camera, visual spectrum light frequencies/wavelengths, etc.) and lower-frequency wave-based sensors (e.g., radar), which can be beneficial as higher-frequency wave-based sensing may be used to generate more granular data (e.g., greater resolution, more data points or detections within a terrain region, etc.) and/or enable detection of broader range of references (e.g., paint, runway indicators, etc.; when compared with lower-frequency wave-based sensing) whereas lower-frequency wave-based sensors may provide additional data robustness (e.g., detections may be independent of cloud cover, fog, etc.). Additionally or alternatively, S110 can include collecting measurements from different modalities having otherwise differing attributes (e.g., using both visual measurements and geometric measurements, etc.). However, any other set of measurements and/or sensors can be used.

During various portions of flight, aircraft states, and/or in various control conditions, different subsets of sensor measurements can be fused to provide the 'primary' control inputs and a remainder of sensors can be regarded as 'auxiliary' or 'secondary' control inputs—which may be individually/cooperatively utilized to validate the primary sensor subset. In a first example, GPS/GNSS and/or inertial sensing can be used for navigation and/or execution of the mission plan during cruise and/or when an aircraft is above the MDA (e.g., minimum descent altitude). In the first example, measurements from time-of-flight (e.g., LIDAR, radar) sensors and/or cameras can be used to cross-check and/or validate primary localization above the MDA. In a second example, time-of-flight and/or optical sensors can be the primary localization/sensing modalities at or below the MDA (e.g., while operating based on visual references), and can be validated based on GPS/GNSS and/or inertial sensing. In a specific example, LIDAR and radar can be the only sensor systems used for primary localization and/or visual flight replacement; however, other sensor systems and combinations thereof can be used. However, any suitable set of sensors can be utilized during each portion of flight.

In a first variant, sensor measurements can include aircraft-referenced returns in 3D (e.g., point to be stitched into a point cloud or other 3D representation such as a height map, depth image, etc.; in a sensor reference frame). In a first example, a lidar and/or radar returns can be taken as distances from the sensor to the ground at various azimuthal/elevation angles in a sensor reference frame, which can be transformed into a spatial representation of the ground in an aircraft reference frame and/or earth reference frame. In a second variant, sensor measurements can include images of the ground/terrain in a sensor (camera) reference frame. In a third variant, sensor measurements can include geo-located positions (e.g., from a GPS sensor) in an earth reference frame. In a first example, GPS/GNSS data can directly provide an earth-referenced aircraft position.

Sensor measurements can optionally be filtered, smoothed, tagged (e.g., in conjunction with a sensor, timestamped, etc.), down-sampled, transformed into a different coordinate frame, and/or otherwise pre-processed before subsequent portions of the method.

However, the sensor measurements can be otherwise suitably sampled.

Extracting features from the sensor measurements S120 which functions to determine features of the terrain proximal to the aircraft that can be compared against a map (e.g., predetermined geo-located features). Additionally or alternatively, features can be used for localization, mapping (SLAM), and/or updating an existing map. Additionally or alternatively, features can be used to identify a landing site in S130.

Features extracted in S120 can be descriptive of a set of visual references for the landing site. Visual references can be used to identify a landing site (e.g., in accordance with S130) and determine a pose of the aircraft relative to the landing site (e.g., localization in accordance with S140; state estimation, etc.). The set of visual references for a landing site can include: longitudinal runway features (e.g., side stripe, centerline, runway lights, etc.; which may be used for lateral alignment), luminaire positions (e.g., or a map thereof), designation markings, a series of alphanumeric characters, threshold markings, touchdown zone markings, side stripes, and/or any other suitable features. In some variants, visual references can be a set of features which an autonomous agent and/or pilot-in-command (PIC) is required to identify when a landing is governed by Visual Flight Rules (VFR). Additionally or alternatively, features can be non-descriptive of visual references (e.g., descriptive of terrain shape or topography elements, appearance or shape of terrestrial infrastructure, etc.). In a specific example, features can describe a geometry and/or visual appearance of a barn near an airstrip, which may be used for aircraft localization (when in proximity to the airstrip) and/or identification of the airstrip, given a prior mapped position of the barn (or features associated therewith stored within the memory onboard the aircraft) relative to the airstrip.

Features function to identify the characteristics of the sampled scene. The features can be used to: identify or verify the landing site; localize the aircraft relative to a scene (e.g., a runway); classify objects within the scene (e.g., using semantic approaches); and/or otherwise used. Features extracted from the sensor measurements can include any suitable 2D and/or 3D detections/feature descriptions such as: SLAM features, structural features (e.g., edges, corners, blobs, ridges, objects, etc.), Hough transforms, structure tensors, affine invariant features, ORB features, SIFT features, SURF features, GLOH features, HOG features, motion features, geometric features, semantic features (e.g., letters, numbers, lane lines, etc.), and/or any other suitable features and/or feature detection/description schema. The features can be associated with: local or global pose, position, or orientation; class (e.g., determined by a classifier); and/or any other suitable parameters. Features can be extracted from a 3D point cloud(s), digital image(s), and/or any other suitable sensor data.

In a first variant, features can be extracted directly from an image or 3D point cloud (e.g., edges, corners, points, lines, etc.). In an example, features extracted in this variant can be compared against a map (of predetermined features) to identify the presence of a landing site and/or an earth-referenced position of the aircraft.

In a second variant, features can be determined using a classifier, which can be used to identify features. In a specific example, a classifier can be used to identify common and/or pre-defined objects (e.g., visual references and/or geometry associated therewith) with inherent industry meaning: such as the letter 'S', a light or strip of lights, a landing site indicator or landing site threshold (e.g., 'beginning of runway'; '1000 feet remaining on runway'; etc.), and/or any other suitable feature classes.

Distinct sensing modalities (and/or measurements thereof) can be associated with the same set of features and/or different sets of features. In a first example, a camera and/or LIDAR sensor can be configured to sense the white paint lettering used to demarcate a particular runway and/or runway characteristics (e.g., elevation, orientation, etc.), while this lettering may not be observable by a radar (e.g., from the radar detections).

In some variants, S120 can include generating a point cloud or other 3D representation of the terrain using sensor data from time-of-flight sensors and/or optical sensors. S120 can generate separate point clouds for various sensing modalities and/or a unified point cloud from a plurality of sensing modalities. In a first example, radar measurements can be used to generate a first point cloud and LIDAR measurements can be used to generate a second point cloud. The first and second point clouds can be combined into a single point cloud (e.g., by down-sampling the lidar measurements, etc.) from which features can be extracted, and/or features can be extracted directly from the first/second point clouds. Alternatively, one or more sensor modalities can exclude point cloud generation, such as for CV-based sensing modalities.

However, any other suitable set of features can be extracted from the sensor measurements.

Features can be extracted: once (e.g., for each iteration of the method), repeatedly, periodically, in response to an event trigger (e.g., condition as determined in S220, etc.), periodically (e.g., with a predetermined update interval, in response to receiving a set of measurements collected in S110, etc.), and/or with any other suitable timing/frequency. S120 is preferably executed at the computing system 120 and/or a localization system 130 thereof, but can be executed at any suitable processing endpoint(s). Extracted features can optionally be stored at the memory 140 used to update a terrain map (e.g., when employed in conjunction with SLAM techniques, to update the set of terrain features for future aircraft missions, etc.).

However, features can be otherwise extracted based on the set of measurements.

Identifying a landing site based on the extracted features S130 functions to detect the unique landing site specified in the mission plan. Additionally or alternatively, 130 can function to detect a specific set of landing site features associated with the landing site (e.g., a feature "fingerprint" for the landing site; based on the flight regime). Additionally or alternatively, S130 can function to satisfy the requirement that a landing site is observable when the aircraft is at or below the MDA, using the extracted features. S130 is preferably performed automatically and/or autonomously, such as in response to the aircraft state satisfying a proximity threshold (e.g., altitude MDA), but can additionally or alternatively be performed as a flight augmentation and/or flight aid (e.g., in response to a manual input). S130 is preferably performed at the onboard computing system 120 (and/or at a localization system 130 thereof), but can additionally or alternatively be performed at any suitable processing endpoint(s). S130 can be performed: once, periodically, in response to satisfaction of an event trigger (e.g., crossing MDA threshold, in response to extraction of features, in response to a request from a pilot, change in control condition, etc.), and/or with any other suitable timing.

S130 preferably includes a comparison of the extracted features with a predetermined set of landing site features (e.g., a map; stored in a memory of the onboard computing system), however S130 can additionally or alternatively include a comparison of the extracted features with a set of previously extracted features (e.g., prior; in conjunction with SLAM; during portions of approach where only a small portion of the landing site is observable—such as immediately preceding and/or during a flare maneuver, at an altitude below 50 feet, etc.). The extracted features can be compared on a sensor basis (e.g., radar features are compared to a radar reference feature set; LIDAR features are compared to a LIDAR reference feature set); a fused basis (e.g., features from the fused point cloud are compared to a fused reference feature set); and/or otherwise compared to reference feature sets for the landing site. In a specific example, features can be compared against a map generated from a prior mission using a similar set of sensors (e.g., same sensor suite on a different aircraft, same sensor arrangement, identical aircraft, same aircraft, etc.).

In a first variant, S130 can include calculating a set of feature matching parameters which functions to indicate a degree of similarity between the extracted features and the predetermined landing site features. S130 can calculate a feature matching parameter in conjunction with: a particular sensing modality (e.g., radar, LIDAR, etc.), an extracted feature (e.g., generated in S120), a landing site feature (e.g., predetermined, stored in memory, etc.), multiple extracted and/or landing site features, and/or any other suitable subsets of features and/or feature comparisons. A feature matching parameter can be calculated by a statistical comparison of feature parameters (e.g., pose, relative position, arrangement, scale; etc.), can be performed by a feature matching engine (e.g., neural network, heuristic analysis engine, etc.), and/or can be otherwise suitably determined. Accordingly, the feature matching parameter can provide a statistical likelihood or confidence that the landing site within the mission plan and/or a specific set of landing site features are being detected by the sensor measurements. In variants, the set of landing site features used for feature searching and/or matching can be dependent on the height above ground level (AGL) and/or proximity to the landing site but can additionally or alternatively be independent of the vehicle state (e.g., flight regime) and/or altitude.

In a specific example of the first variant, the S130 can include determining a notional 'confidence interval' for a particular set of sensors. The confidence intervals for different sensor sets can be subsequently fused into a confidence score as part of S150 (e.g., a notional 'accuracy index').

In a second variant, S130 can include a binary determination of the presence of the landing site (or absence of the landing site), which can be determined based on the presence of one or more extracted features (e.g., runway lettering; predetermined set of features—such as required by aviation code; etc.), a manual input by a pilot, and/or any other suitable binary determination of the presence of the landing site. In a first example, the landing site feature set for the planned landing site can be pre-loaded, wherein the extracted features can be compared against the landing site feature set to verify that the aircraft has arrived at the correct landing site (e.g., wherein a confidence or proximity score exceeds a threshold). In a second example, the extracted features can be compared against the landing site feature sets for a plurality of landing sites, wherein the physical landing site is identified as closest-matching landing site. The presence of the landing site is verified when the closest-matching landing site matches the planned landing site.

In variants, the feature searches/comparison(s) in S130 can optionally be seeded, constrained, and/or limited based on the mission plan, a prior state estimate, and/or an estimate generated based on secondary sensors. For example, instrument navigation sensors may be used to limit or refine a feature search space to reduce processing resource requirements of S130. In an illustrative example, the method can include: selecting a landing site map for a landing site based on the aircraft geolocation, altitude, and/or flight plan; and comparing the detected features against the features within the landing site map. Alternatively, the detected features can be compared against all possible landing site features to both identify the landing site and resolve the aircraft pose.

However, the landing site can be otherwise suitably identified.

Optionally localizing the aircraft based on the extracted features S140 functions to determine an aircraft position estimate using the extracted features. S140 is preferably executed at the onboard computing system 120 using a localization system 130 thereof, but can be otherwise implemented. S140 is preferably executed periodically (e.g., based on extracted features, over last N measurement frames), but can additionally or alternatively be performed aperiodically, such as at a varying frequency based on the availability of measurement data and/or the measurement data source. Alternatively, the aircraft can be localized exactly once for a single instance of the method or exactly once per control condition, such as when the system is implemented as a flight-aid (e.g., verifying observability of the landing site). However S140 can occur with any suitable frequency/timing.

The aircraft can be localized: by comparing the position (and/or orientation) of extracted features relative to a map (e.g., a priori SLAM map; previously or pre-determined map; etc.), by analyzing aircraft motion relative to prior position estimate (e.g., odometry/dead-reckoning), based on the presence of specific identified landing site features (e.g., 'beginning of runway' pattern, runway boundary lines, '1000 feet remaining' pattern, etc.), by directly generating a position estimate from sensor measurements (e.g., GPS/GNSS), and/or otherwise suitably localized. S140 can generate a single aircraft position estimate and/or a plurality of aircraft position estimates, each respectively associated with a different sensing modality. A single (unified) aircraft position estimate can be generated from the features extracted from a unified point cloud (e.g., combination of sensing modalities—such as radar and lidar) or from a voted combination of extracted features (e.g., weighted based on the respective feature matching parameters). A plurality of aircraft position estimates can be generated by separate (parallel) evaluations of the features extracted from distinct sets of measurements (and subsequently fused or used in combination for validation). Alternatively, a single aircraft position estimate can be generated.

In a first variant, the aircraft position can be estimated by simultaneous localization and mapping (SLAM) using the extracted features. In a first example, SLAM can localize by referencing a map of predetermined landing site features (e.g., which are geo-located; navigate relative to the landing site features). In a second example, SLAM can be performed relative to previously extracted features. In a third example, SLAM maps can be used to update the set of landing site features associated stored in conjunction with the landing site (e.g., to be used for future landings).

In a second variant, the aircraft position and/or pose can be directly estimated from sensor measurements (e.g., GPS and/or inertial sensing). For example, the aircraft position (and/or orientation) can be directly estimated from sensor measurements when the aircraft is operating in an instrument-referenced regime (e.g., above an MDA).

In variants, S140 can include determining aircraft state parameters which can include: ego-frame parameters, earth-frame parameters, lateral aircraft parameters (e.g., alignment parameters relative to runway, groundspeed, latitude/longitude coordinates, etc.), vertical aircraft parameters, timederivatives of spatial parameters (e.g., heading rate, vertical rate, speed, groundspeed, etc.) and/or any other suitable aircraft state parameters. In a first example, rate parameters can be determined based on a recent time history of the aircraft position and/or aircraft state (e.g., last N data frames, etc.). Alternatively, rate parameters can be determined based on sensor measurements from current sensor data (e.g., doppler radar, airspeed sensors, etc.), without reliance on a time history. Aircraft state parameters determined in S140 can be absolute (e.g., latitude, longitude, altitude, heading, etc.) and/or relative to a landing site. In a specific example, aircraft state can include and/or define an aircraft alignment relative to a longitudinal landing site feature (e.g., side stripes) and/or a longitudinal axis of a runway (e.g., centerline).

However, the aircraft can be otherwise suitably localized.

Determining a confidence score based on the extracted features and landing site features S150 functions to establish a metric of the accuracy of the landing site identification, the point cloud(s), and/or aircraft position estimation to be used to determine aircraft control. One or more instances and/or variants of S150 can be performed for different steps of the method. S150 is preferably executed by the onboard computing system 120 and/or a validation system 160 thereof, but can additionally or alternatively be determined remotely (e.g., remote validation system), and/or can be otherwise performed. In variants, S150 can be a deterministic and/or certified evaluation which can be used to determine whether sensor inputs, localization/state estimates, and/or landing site identifications may be relied upon.

In first variant (e.g., when identifying the landing site at the MDA), the confidence score can be determined by combining feature matching parameters—such as using a lookup table (e.g., each combination of feature mapping parameters mapping to a confidence score value), statistical algorithm, heuristics, and/or any otherwise suitably relating various feature matching parameters. In a specific example, a first feature matching parameter associated with a first sensing modality (e.g., radar) and a second feature matching parameter associated with a second sensing modality (e.g., LIDAR) can be fused to generate a single confidence score (e.g., an 'accuracy index' determined from the combination of notional 'confidence intervals').

In a second variant, the confidence score can be determined by a statistical comparison of position estimates from a plurality of localization techniques, such as by comparing position estimates determined via radar SLAM, LIDAR SLAM, terrain relative navigation, GPS, and/or inertial navigation.

In a third variant, the confidence score can be adjusted based on calibration accuracy and/or sensor weight (e.g., static; variant based on the flight regime, aircraft state, and/or control condition; etc.).

In a fourth variant, the point cloud accuracy is determined (e.g., calculated) based on the accuracy of the sensor measurements (e.g., the respective residuals), wherein the measurement accuracies can be evaluated independently (e.g., wherein a single measurement below the accuracy threshold causes the aircraft to abort the landing process); in aggregate (e.g., wherein a combined accuracy is calculated and compared against the accuracy threshold); and/or otherwise evaluated.

In a fifth variant, the point cloud accuracy is determined based on the features extracted from the point cloud, wherein a score (e.g., confidence score) can be calculated based on a comparison between the extracted features (and/or parameters thereof) and a reference feature set for the landing site (e.g., for the current flight regime), the waypoint, and/or the estimated aircraft location. This can have an added benefit of verifying that the aircraft is at the correct landing site.

In a sixth variant, the confidence score can be determined from the confidence score and/or error of the pose estimate (e.g., estimated from the detected features).

In a seventh variant, the confidence score can be determined by any combination of the previous variants. However, the confidence score can be otherwise determined.

Figure 5:
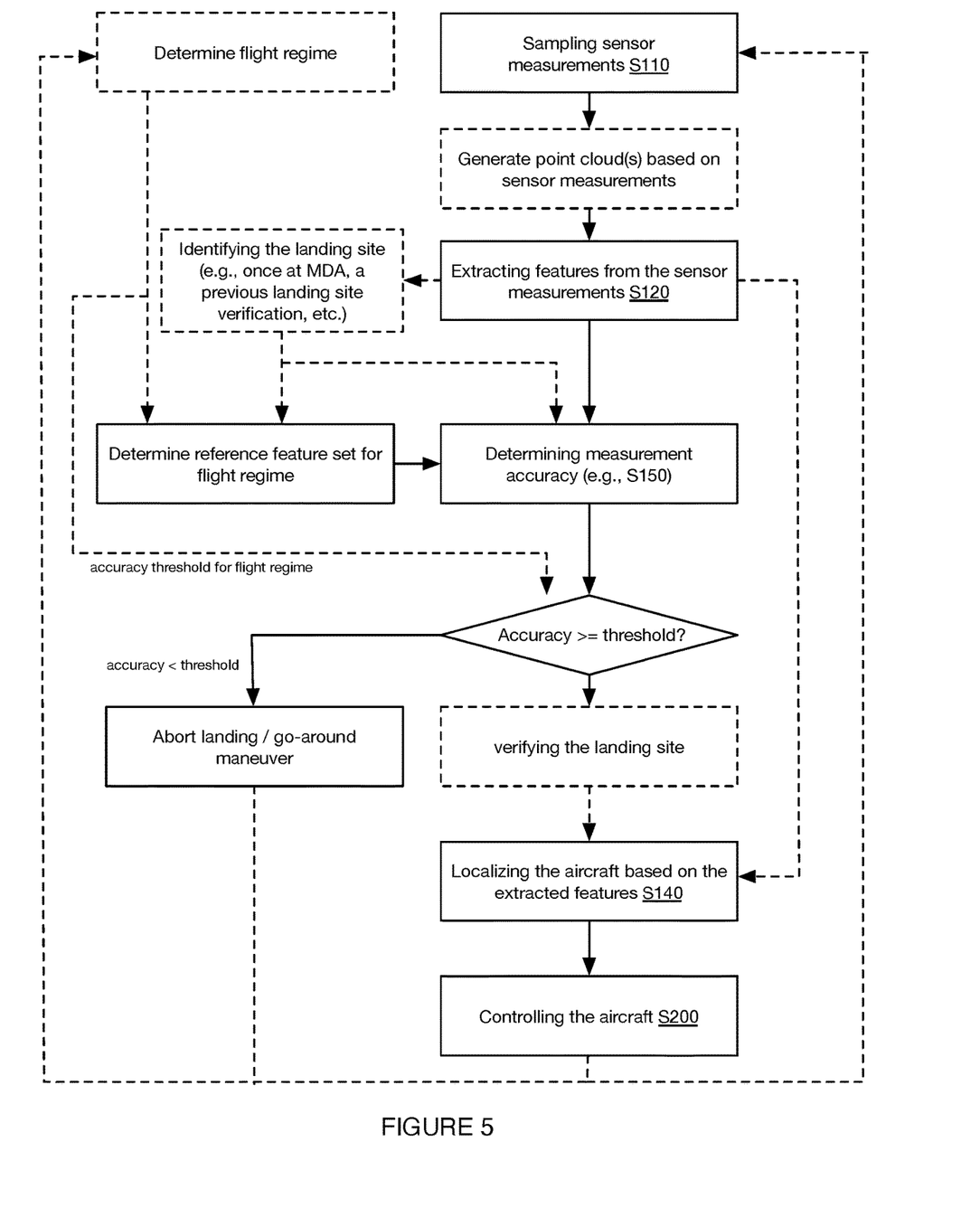
FIG. 5 is a diagrammatic representation of a variant of the method.

In variants, the confidence score can be determined and/or evaluated based on the aircraft state (e.g., based on the flight regime; an example is shown in FIG. 5). As an example, before the aircraft reaches a landing site proximity threshold, the confidence score can indicate a degree of confidence that the identified landing site is the predetermined landing site within the mission plan. Subsequently, the confidence score can indicate a degree of confidence that a subset of landing site features are being detected and/or a degree of confidence that multiple sensing modalities coincide with the estimated aircraft position relative to the landing site.

The confidence score can be determined once (e.g., at the MDA) or repeatedly (e.g., periodically; until landing zone is identified and/or landing site features are outside of the field of view; etc.), upon satisfaction of a proximity threshold (e.g., distance to landing site, altitude MDA), and/or with any other suitable timing.

In an example, the aircraft can transition from instrument referenced flight to visual referenced flight by: while controlling the aircraft according to the mission plan, satisfying a proximity threshold (e.g., altitude less than or equal to the MDA, within a predetermined range of the landing site, at or below a predetermined altitude threshold, etc.); optionally determining an accuracy of sampled measurements; extracting features from sensor measurements (e.g., from individual sensor sets, from a point cloud fused from multiple sensor sets, etc.); identifying the landing site based on the extracted features (e.g., which can include computing first and second feature matching parameters associated with radar and LIDAR, respectively); and determining a confidence score (e.g., by fusing the first and second feature matching parameters into a notional 'accuracy'; landing site confidence score; SLAM estimation error; etc.). If the confidence score satisfies a threshold (e.g., six sigma; detection error less than $10^{-7}$; etc.) the aircraft can proceed to an approach regime. Alternatively, if the measurement accuracy and/or the confidence score does not satisfy the threshold, the aircraft can abort the landing (e.g., execute a 'go around' maneuver) and/or can preserve instrument guidance (e.g., GPS/inertial as primary sensing modalities). However, within the approach regime, subsequent confidence score determinations can be otherwise made and/or used to determine aircraft control.

However, the confidence score can be otherwise suitably determined.

Controlling the aircraft S200 functions to enable traversal of the aircraft to a predetermined landing site. The aircraft is preferably controlled by (autonomous) aircraft guidance and/or navigational systems which can command actuation of various effectors (e.g., via an FMS, FCS, etc.) and propulsion systems of the aircraft in order to execute the mission plan. The aircraft can be controlled in S200 in various regimes of flight, such as 'cruise', 'approach' (e.g., landing sequence), 'go-around maneuver', and/or any other suitable flight regimes. Within each flight regime, the aircraft can be controlled by determining the aircraft state (e.g., geodetic position, heading, velocity, acceleration, etc.), which can be provided to the navigation/guidance systems to affect aircraft control based on the flight regime. The aircraft control based on the aircraft state (and/or each parameter therein) can be the same or different for the various flight regimes. S200 preferably controls the aircraft by determining flight commands (e.g., to be executed by the FMS/FCS) based on the aircraft state and the control condition. Flight commands can be in the form of: navigational instructions/parameters, a flightpath, an aircraft trajectory, waypoints, lateral adjustments, vertical adjustments, and/or in any other suitable format. S200 is preferably executed autonomously/automatically by the onboard computing system 120 (e.g., a navigation system 150 or autopilot system thereof), but can additionally or alternatively be otherwise suitably performed. S200 can occur continuously, periodically, aperiodically, and/or with any other suitable frequency/timing.

Determining an aircraft state S210 functions to provide loop closure for effector control and/or navigation in each flight regime. The state of the aircraft can include the geodetic position of the aircraft, the attitude (e.g., pitch, roll, and yaw/heading) of the aircraft, a linear velocity vector of the aircraft, an angular velocity vector of the aircraft, a linear acceleration vector of the aircraft, an angular acceleration vector of the aircraft, a relative wind velocity of the aircraft, an above ground level (AGL) altitude of the aircraft, and/or any other suitable vehicle state parameters. The state of the aircraft is preferably determined using the aircraft localization in S140, but can additionally or alternatively be determined by fusing any suitable set of aircraft sensors. In an example, lateral parameters (e.g., runway alignment, heading, heading rate, etc.) can be generated by fusing a SLAM estimate generated using primary localization sensors/features with a set of secondary sources (e.g., GPS, magnetometer, etc.). In a second example, vertical parameters can be taken directly from measurement sources (e.g., AGL sensor, radar altimeter, etc.) and/or generated from extracted features.

In a first variant, determining an aircraft state can include localizing the aircraft using a primary set of sensors and validating the position estimate using auxiliary sensing, wherein the primary set of sensors is specified according to a flight control condition. In a first example, in a first flight regime (e.g., before the aircraft reaches a proximity threshold of the landing site) the primary set of sensors can include GPS/GNSS and/or inertial sensors and the auxiliary sensors can include optical and/or time-of-flight sensors. In a second example, in a second flight regime (e.g., after satisfying the proximity threshold relative to the landing site), the primary set of sensors can include time-of-flight and/or optical sensors, and the auxiliary sensors can include GPS/GNSS and/or inertial sensors.

However, the aircraft state can be otherwise suitably determined.

Determining a control condition S220 functions to transition between the various flight regimes. Determining a control condition can include satisfaction of a proximity threshold, satisfaction of a confidence score threshold, satisfaction of a flare threshold, a determination that the touch down zone is reachable, and/or any other suitable determination. Control conditions can be dependent and/or variant depending on the flight regime and/or independent of flight regimes. There can be a single control condition associated with a flight regime, multiple control conditions associated with a flight regime, and/or no control conditions associated with a flight regime (e.g., taxi, after the aircraft is fully committed to landing—such as immediately prior to touch down)

Figure 2:
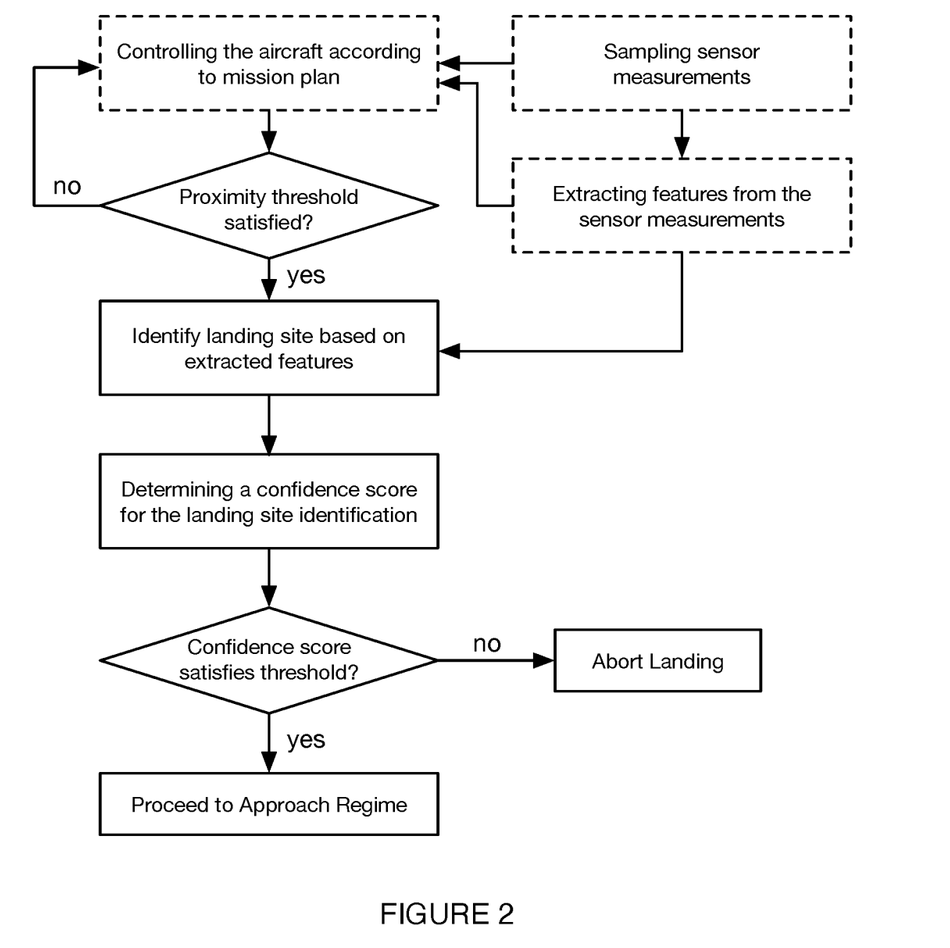
FIG. 2 is a diagrammatic representation of a variant of the method.

In a first variant, the flight regime can transition out of a cruise regime upon satisfaction of a proximity threshold. In a first example, the flight regime transitions to an approach regime upon an identification of the landing site with a confidence score satisfying a predetermined threshold (an example is shown in FIG. 2). In a second example, the flight regime transitions to a 'go-around maneuver' and/or an aborted landing upon if the confidence score does not satisfy the predetermined threshold (e.g., wherein mission plan is updated and the aircraft automatically re-enters a cruise condition).

Figure 4:
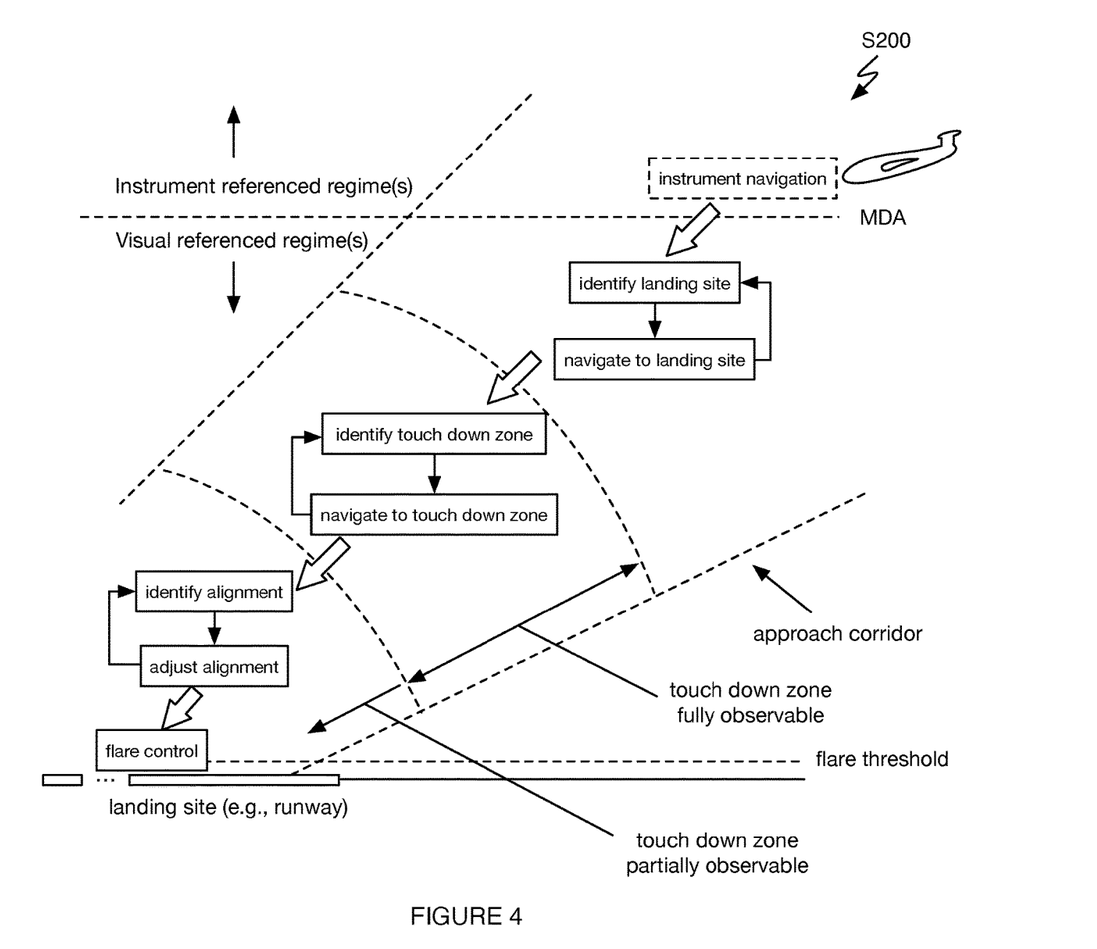
FIG. 4 is a schematic representation of a variant of the method in conjunction with aircraft proximity to a landing site.

In a second variant, the aircraft can transition out of the approach regime if a touch down zone is determined to be unreachable. Accordingly, during approach, S200 can include repeatedly, periodically, and/or continuously adjusting the flightpath/control based on the aircraft localization—such as by determining vertical and/or lateral adjustments to enable aircraft traversal to the landing zone. While the adjustments remain within the control limits of the aircraft (e.g., for the current vehicle state and/or environmental conditions—such as wind velocity; within flight envelope protections; etc.) and/or within a predetermined approach corridor (e.g., an example is shown in FIG. 4; predetermined for a particular landing site), the aircraft can remain within the approach regime and/or proceed with the landing sequence. When the determined adjustments and/or effector control exceed the control limits, the aircraft can abort the landing (e.g., such as executing a go-around maneuver, automatically adjusting waypoints and re-entering the cruise regime, etc.). In a specific example, the touch down zone spans a portion of a runway which is offset from the end of the runway by at least a minimum rollout distance. The minimum rollout distance can be specified for a particular aircraft and/or dynamically determined based on the aircraft state (e.g., adjusted based on the current velocity and/or estimated touchdown velocity associated with the current vehicle state). Otherwise, the aircraft can be controlled towards the touch down zone within the approach mode according to the vehicle state. In a specific example, if the landing zone is reachable, S200 can control the aircraft within the approach regime.

In the second variant, the touch down zone may be observable during only some portions of approach and/or may be unobservable during a portion of approach. Accordingly, S200 can employ different navigational techniques during different periods of approach and/or while various landing site features remain observable. In a first example, during a first period of approach, the navigation can rely on an identification of the landing site (in excess of a threshold confidence score) and/or an estimated aircraft position relative to the landing site in order to determine that the touch down zone is reachable (i.e. determining that the touch down zone is reachable may be irrespective of the aircraft velocity and/or control limits—such as while the aircraft has lots of time/space to make adjustments). In this example, S200 can include navigating to the landing site (e.g., rather than the touch down zone explicitly; where one or more landing site features of the landing site are too far away to be accurately identified). In a second example, the aircraft can rely on a prior: identification of the landing site, determination of the touch down zone, landing site feature determination, aircraft position estimate, and/or other suitable determination in order to determine control in S200. In this example, aircraft control can be determined based on the alignment relative to a subset of landing site feature (e.g., painted stripes running the length of a runway and bounding the sides of the runway), and rely upon previous determinations that the aircraft is landing 1) within the touch down zone; and 2) at the correct landing site.

In a third variant, the aircraft can transition to a flare regime upon satisfaction of a flare threshold, which can be specified based on the aircraft state and/or aircraft control characteristics. In a specific example, the flare threshold can be a threshold height above the landing site which can be predetermined for a particular aircraft. In a second example, the flare threshold can be determined based on the aircraft state (e.g., velocity, pitch angle, etc.).

In a fourth variant, the aircraft automatically transitions into a taxi regime upon touchdown (e.g., after execution of an aerodynamic flare).

Figure 6:
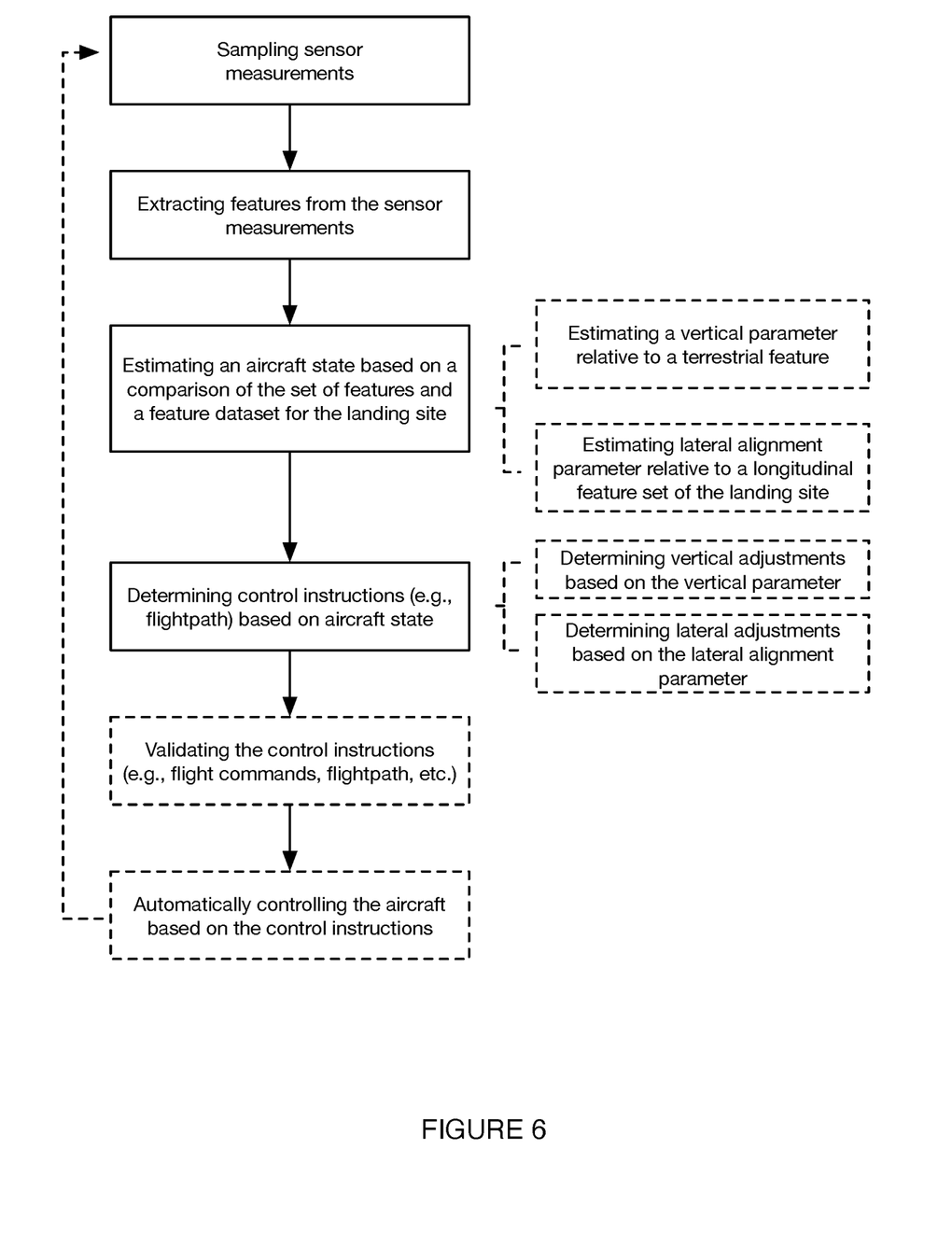
FIG. 6 is a diagrammatic example of a variant of the method.

S220 can optionally include validating aircraft state inputs and/or flight commands (e.g., an example is shown in FIG. 6), which functions to cross-check autonomous/automatic determinations. Inputs and/or flight commands can be validated by: receiving a pilot validation of flight commands and/or navigational instructions; receiving a validation from a ground-based validation infrastructure; determining that a confidence score and/or accuracy index satisfies a predetermined conditions; based on a comparison of localization estimates derived from a secondary set of sensors (e.g., separate and distinct from a primary set of sensors; validating LIDAR, radar, and/or cameras using GPS/GNSS and/or inertial odometry) and/or flight commands can be otherwise validated. Validation is preferably performed at a validation system of the onboard computing system (e.g., having a high design assurance level, having a higher design assurance level than the localization system and/or navigation system), but can additionally or alternatively be distributed between various elements and/or processing modules of the onboard computing system. In response to validation, the flight commands can be automatically executed (e.g., with a FCS/FMS of the aircraft) and/or aircraft state can be stored/updated in an onboard memory based on the localization inputs. Alternatively, if flight commands and/or an aircraft state (estimated based on primary sensors) cannot be validated, the system can automatically abort a landing, execute a go-around maneuver (e.g., transitioning to an instrument referenced regime governed by IFR, aborting landing the aircraft on final approach or that has already touched down, etc.), and/or handoff control to a pilot-in-command.

However, the aircraft can otherwise suitably transition between flight regimes.

However, the aircraft can be otherwise suitably controlled.

4. EXAMPLES

Figure 3:
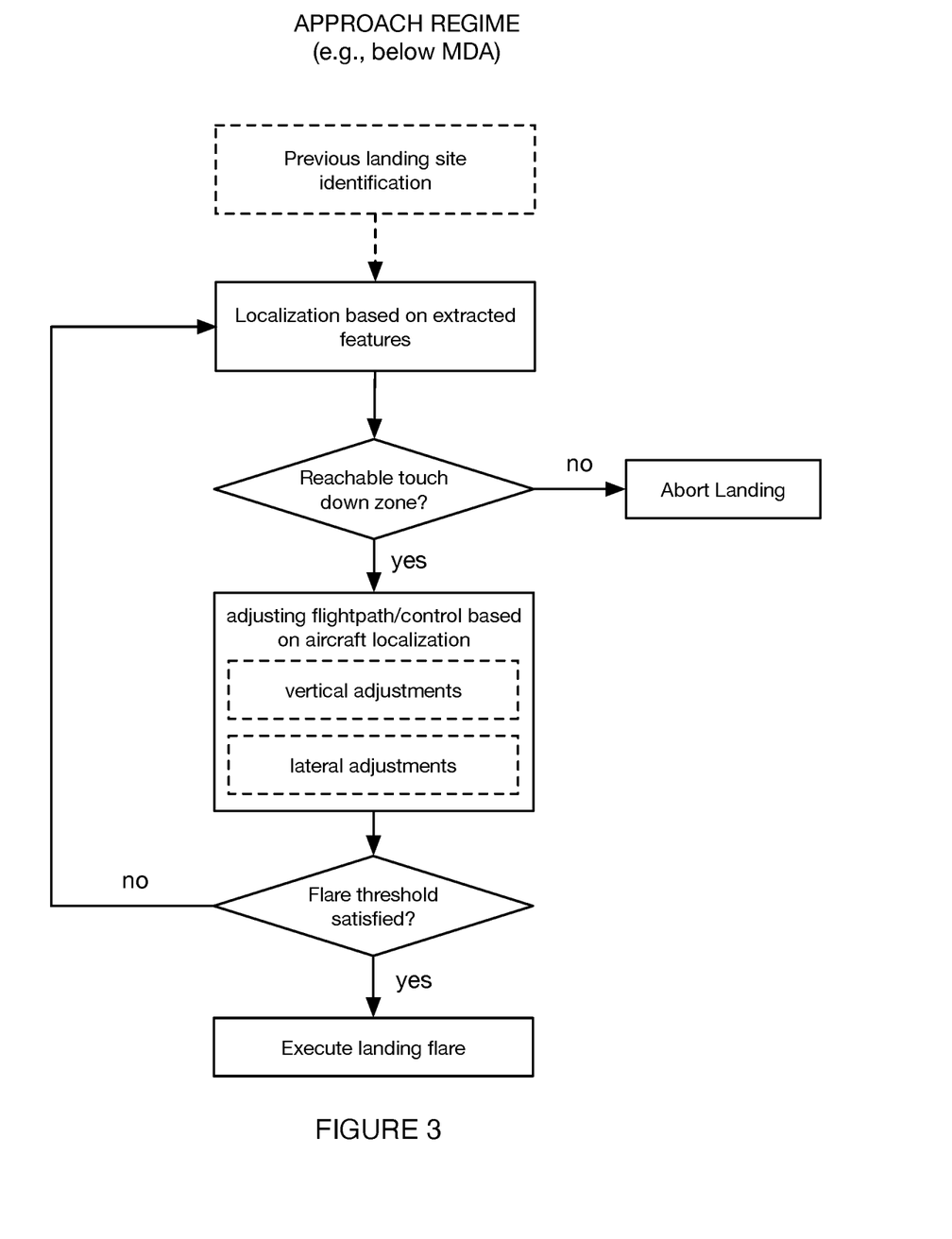
FIG. 3 is a diagrammatic representation of a variant of the method.

In variants, while controlling the aircraft according to the mission plan, the aircraft can periodically, continuously, and/or repeatedly determine if the touch down zone is reachable based on localization from the extracted features and/or a previous landing site identification. If the touch down zone is not reachable, the aircraft can abort the landing (e.g., execute a go-around maneuver, transition back to instrument guidance, gain altitude, etc.). During approach and/or while the touch down zone remains reachable, the aircraft can make adjustments (e.g., modify flightpath and/or trajectory) based on the aircraft position estimate—such as by making vertical and/or lateral adjustments (an example is shown in FIG. 3). In a first example, vertical adjustments can be made based on radar altimetry and/or time-of-flight (e.g., radar and/or lidar) localization. In a second example, lateral adjustments can be performed based on fused time-of-flight localization and/or visual-analog sensing modalities. The aircraft can continue to make adjustments until either the landing is aborted or the aircraft reaches a flare threshold—at which point the aircraft can execute an aerodynamic flare and land within the touch down zone.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein. As a person skilled in the art will recognize from the previous detailed description and from the figures and claims, modifications and changes can be made to the preferred embodiments of the invention without departing from the scope of this invention defined in the following claims.

We claim:

1. A method for controlling an aircraft according to a mission plan which defines a landing site, the method comprising:
   automatically controlling the aircraft to execute a go-around maneuver based on a failure to satisfy a confidence threshold;
   automatically determining satisfaction of a proximity threshold and, in response:
   identifying a set of visual references based on features extracted from measurements collected with a first set of time-of-flight sensors onboard the aircraft, the first set of time-of-flight sensors comprising a LIDAR sensor; and
   determining a confidence score value associated with the identification of the set of visual references; and
   verifying observability of the landing site with the measurements by a binary determination that the confidence score value satisfies the confidence threshold; and
   responsive to the binary determination that the confidence score value satisfies the confidence threshold, automatically controlling the aircraft within an approach corridor of the landing site based on the set of visual references, comprising:
   estimating an aircraft state based on a position of at least one of the visual references of the set, wherein the aircraft state is estimated with simultaneous localization and mapping (SLAM) using the extracted features; and
   generating navigational instructions based on the aircraft state, wherein automatically controlling the aircraft to execute the go-around maneuver occurs prior to verifying observability of the landing site.

2. The method of claim 1, wherein the method further comprises, prior to automatically determining satisfaction of the proximity threshold:
estimating an instrument-derived aircraft state based on a second set of aircraft sensors, wherein the first set of time-of-flight sensors and the second set of aircraft sensors are disjoint; and
based on the instrument-derived aircraft state, generating instrument-derived navigational instructions according to the mission plan.

3. The method of claim 2, further comprising:
extracting a first and a second set of features from measurements of a first and second time-of-flight sensor of the first set of time-of-flight sensors, respectively;
identifying a first subset of visual references using only the first set of features;
identifying a second subset of visual references using only the second set of features; and
determining the confidence score value based on the identification of both the first and second subsets of visual references.

4. The method of claim 1, wherein the set of visual references are stored at a local memory onboard the aircraft in association with the landing site prior to a departure of the aircraft according to the mission plan.

5. The method of claim 1, wherein the set of visual references comprises a series of alphanumeric characters, a threshold marking, a touchdown zone marking, designation marking, or a side stripe.

6. The method of claim 1, wherein the set of visual references comprises a map of luminaires.

7. The method of claim 1, wherein the aircraft state comprises an aircraft alignment relative to a longitudinal runway feature, wherein the navigational instructions comprise a lateral adjustment based on the aircraft alignment.

8. The method of claim 1, further comprising, subsequently:
extracting a second set of features using measurements from a second set of sensors;
identifying a second set of visual references based on the second set of features;
estimating an updated aircraft state based on the second set of visual references;
based on the updated aircraft state, determining a go-around event; and
automatically generating a second set of navigational instructions for a go-around maneuver based on the determination of the go-around event.

9. The method of claim 1, wherein automatically controlling the aircraft further comprises: automatically providing the navigational instructions to a flight control system of the aircraft in response to receiving a pilot validation of the navigational instructions.

10. The method of claim 1, wherein automatically controlling the aircraft within an approach corridor of the landing site based on the set of visual references comprises controlling the aircraft under Visual Flight Rules (VFR) below a Minimum Descent Altitude (MDA) of the landing site based on the identified set of visual references.

11. The method of claim 1, wherein the confidence score value is determined as a likelihood, a probability, or a heuristic.

12. The method of claim 1, wherein the confidence score value is determined without GPS localization.

* * * * *